United States Patent
Shirai

(10) Patent No.: US 7,583,296 B2
(45) Date of Patent: Sep. 1, 2009

(54) IMAGING APPARATUS

(75) Inventor: Kunihiro Shirai, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 424 days.

(21) Appl. No.: 11/683,557

(22) Filed: Mar. 8, 2007

(65) Prior Publication Data

US 2007/0273772 A1   Nov. 29, 2007

(30) Foreign Application Priority Data

Mar. 29, 2006  (JP) .............................. 2006-091708

(51) Int. Cl.
*H04N 5/228* (2006.01)

(52) U.S. Cl. .................. 348/222.1; 348/241; 348/314

(58) Field of Classification Search .................. 348/241
See application file for complete search history.

(56) References Cited

U.S. PATENT DOCUMENTS

| | | | |
|---|---|---|---|
| 5,121,192 A * | 6/1992 | Kazui .......................... 348/277 |
| 6,211,509 B1 * | 4/2001 | Inoue et al. ............... 250/208.1 |
| 6,307,195 B1 * | 10/2001 | Guidash ................... 250/208.1 |
| 2004/0239791 A1 | 12/2004 | Mabuchi | |
| 2006/0044437 A1 * | 3/2006 | Shah .......................... 348/308 |

FOREIGN PATENT DOCUMENTS

JP   2003-018471 A   1/2003

* cited by examiner

*Primary Examiner*—Jason Chan
*Assistant Examiner*—Cynthia Calderon
(74) *Attorney, Agent, or Firm*—Canon U.S.A., Inc. I.P. Division

(57) ABSTRACT

An imaging apparatus includes a plurality of pixel portions, each including a photoelectric conversion section and a holding section. The holding section is configured to hold a mixed saturation signal containing a saturation signal overflowing a photoelectric conversion section of the same pixel portion and a saturation signal overflowing a photoelectric conversion section of another pixel portion which functions as a color mixture component. A color mixture correcting section is configured to correct a color mixture component contained in the mixed saturation signal read out of the holding section. A combining section is configured to combine a photoelectric conversion signal read out of the photoelectric conversion section and a corrected saturation signal corrected by the color mixture correcting section.

5 Claims, 15 Drawing Sheets

IMAGING APPARATUS

BACKGROUND OF THE INVENTION

1. Field of the Invention

The present invention relates to an imaging apparatus and a related processing method capable of enlarging a dynamic range while suppressing generation of color mixture.

2. Description of the Related Art

A solid-state image sensor, such as a complementary metal-oxide semiconductor (CMOS), can be used in a digital camera or other imaging apparatuses. However, compared to general silver-halide photography, the solid-state image sensor has a narrow dynamic range. To solve this drawback, there are various dynamic range enlarging methods (refer to Japanese Patent Application Laid-Open No. 2003-18471).

For example, according to an image sensor discussed in Japanese Patent Application Laid-Open No. 2003-18471, saturated charge overflows a photoelectric conversion section and flows into a reading section if a light quantity of incident light exceeds a saturation light quantity of the photoelectric conversion section. The reading section reads an overflow amount of the electric charge.

However, a reading section of an actually used image sensor is not arranged to realize the reading mechanism discussed in Japanese Patent Application Laid-Open No. 2003-18471. Therefore, when the method discussed in Japanese Patent Application Laid-Open No. 2003-18471 is applied to an ordinary image sensor, the generation of color mixture in the reading section is much greater compared to that in the photoelectric conversion section.

SUMMARY OF THE INVENTION

Exemplary embodiments of the present invention are directed to an imaging apparatus capable of realizing a wide dynamic range while suppressing generation of color mixture.

According to an aspect of the present invention, an imaging apparatus includes: a plurality of pixel portions, each including a photoelectric conversion section and a holding section, wherein the holding section is configured to hold a mixed saturation signal containing a saturation signal overflowing a photoelectric conversion section of the same pixel portion and a saturation signal overflowing a photoelectric conversion section of another pixel portion which functions as a color mixture component; a color mixture correcting section configured to correct a color mixture component contained in the mixed saturation signal read out of the holding section; and a combining section configured to combine a photoelectric conversion signal read out of the photoelectric conversion section and a corrected saturation signal corrected by the color mixture correcting section.

According to another aspect of the present invention, a method is provided for an imaging apparatus including a plurality of pixel portions, each including a photoelectric conversion section and a holding section, wherein the holding section is configured to hold a mixed saturation signal containing a saturation signal overflowing a photoelectric conversion section of the same pixel portion and a saturation signal overflowing a photoelectric conversion section of another pixel portion which functions as a color mixture component. The method includes: correcting a color mixture component contained in the mixed saturation signal read out of the holding section; and combining a photoelectric conversion signal read out of the photoelectric conversion section and a corrected saturation signal subjected to color mixture correction.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Figure 1:
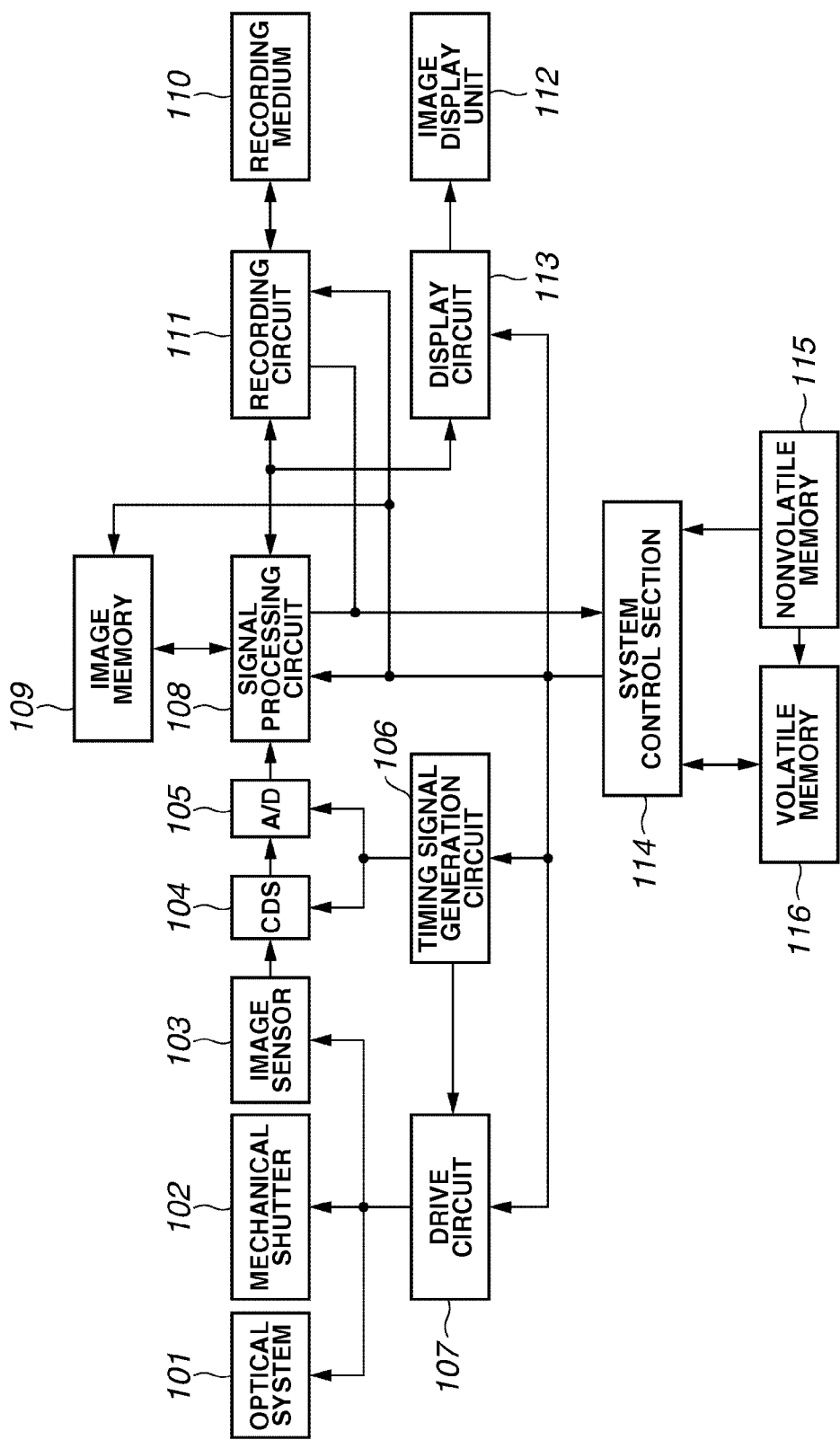
FIG. 1 is a block diagram illustrating an imaging apparatus according to a first exemplary embodiment of the present invention.

The following description of exemplary embodiments is merely illustrative in nature and is in no way intended to limit the invention, its application, or uses.

It is noted that throughout the specification, similar reference numerals and letters refer to similar items in the following figures, and thus once an item is defined in one figure, it may not be discussed for following figures.

Exemplary embodiments will be described in detail below with reference to the drawings.

First Exemplary Embodiment

FIG. 1 is a block diagram illustrating an imaging apparatus according to a first exemplary embodiment of the present invention.

The imaging apparatus shown in FIG. 1 includes an optical system 101 (e.g., including a lens and a diaphragm), a mechanical shutter 102, an image sensor 103, a correlated double sampling (CDS) circuit 104 performing analog signal processing, and an analog-digital (A/D) converter 105 converting an analog signal to a digital signal. A timing signal generation circuit 106 can generate timing signals to actuate the image sensor 103, the CDS circuit 104, and the A/D converter 105. A drive circuit 107 has a function of driving each of the optical system 101, the mechanical shutter 102, and the image sensor 103.

Furthermore, the imaging apparatus includes a signal processing circuit 108 applying signal processing to image data captured by the image sensor 103 and an image memory 109 storing the image data processed by the signal processing circuit 108. A recording circuit 111 receives image data processed by the signal processing circuit 108 and can record the processed image data on an image recording medium 110. The image recording medium 110 is removable from the imaging apparatus.

An image display unit 112 receives the image data from the signal processing circuit 108 via a display circuit 113. The display circuit 113 can control the image display unit 112 to display an image based on the received image data. A system control section 114 can control an overall operation of the imaging apparatus based on a program stored in a nonvolatile memory (e.g., a read-only memory (ROM)) 115. The nonvolatile memory 115 can also store control data (e.g., parameters and tables used when the program is execute) and correction data (e.g., addresses of defects on pixels). Furthermore, the program, control data, and correction data can be transferred from the nonvolatile memory 115 to a volatile memory (e.g., a random access memory (RAM)) 116. The volatile memory 116 can be used as a work area when the system control section 114 controls the imaging apparatus.

The imaging apparatus having the above-mentioned arrangement can perform a shooting action with the mechanical shutter 102. Prior to a shooting action, the system control section 114 starts a preparatory operation including turning on a power source of the imaging apparatus. The preparatory operation of the system control section 114 includes reading a necessary program from the nonvolatile memory 115 together with related control data and correction data and transferring the read program and the data to the volatile memory 116.

The software program(s) and data can be used when the system control section 114 controls the imaging apparatus. If necessary, additional program(s) and data can be transferred from the nonvolatile memory 115 to the volatile memory 116. The system control section 114 can directly read the data from the nonvolatile memory 115.

First, the drive circuit 107 drives the diaphragm and the lens of the optical system 101 in response to a control signal supplied from the system control section 114, to form an object image having an appropriate lightness on the image sensor 103. Next, the drive circuit 107 drives the mechanical shutter 102 in response to a control signal supplied from the system control section 114. The mechanical shutter 102 shields the image sensor 103 from light according to an action of the image sensor 103, so as to obtain a necessary exposure time. In this case, if the image sensor 103 has an electronic shutter function, the mechanical shutter 102 and the image sensor 103 can cooperatively determine a necessary exposure time.

The drive circuit 107 drives the image sensor 103 in response to a drive pulse which is produced based on an operation pulse generated by the timing signal generation circuit 106, which is controlled by the system control section 114. The image sensor 103 has a photoelectric conversion function for converting an object image into an electrical signal and outputs an analog image signal.

The CDS circuit 104 receives the analog image signal from the image sensor 103, and removes clock synchronous noises from the image signal in response to an operation pulse generated by the timing signal generation circuit 106, which is controlled by the system control section 114. The A/D converter 105 converts the analog image signal into a digital image signal.

Next, under the control of the system control section 114, the signal processing circuit 108 applies various processing to the digital image signal. The processing includes image processing such as color conversion, white balance, gamma correction, etc., as well as resolution conversion processing and image compression processing.

The image memory 109 can temporarily store digital image signals being processed by the signal processing circuit 108 and also store image data (i.e., digital image signals) resulting from the signal processing performed by the signal processing circuit 108.

The image data produced by the signal processing circuit 108 or the image data stored in the image memory 109 can be supplied to the recording circuit 111. The recording circuit 111 can convert the input image data into data format (e.g., file system data having a hierarchical structure) suitable for the image recording medium 110 and can record the converted image data on the image recording medium 110.

Furthermore, the image data produced by the signal processing circuit 108 or the image data stored in the image memory 109 can be subjected to resolution conversion processing by the signal processing circuit 108 and supplied to the display circuit 113. The display circuit 113 can convert the input image data into a display signal (e.g., an analog NTSC signal) suitable for the image display unit 112 and can display an image corresponding to the display signal on the image display unit 112.

The signal processing circuit 108 can directly output the digital image signal, as image data, to the image memory 109 or to the recording circuit 111, without performing the above-described signal processing when the control signal is supplied from the system control section 114.

Furthermore, the system control section 114 can request the signal processing circuit 108 to transmit, to the system control section 114, information on the digital image signal or image data resulting from the signal processing, such as information relating to a spatial frequency of the image, an average value of a designated region, the data amount of a compressed image, or, derivative information extracted from such information. Furthermore, the system control section 114 can request the recording circuit 111 to transmit, to the system control section 114, information on a type and an available capacity of the image recording medium 110.

Figure 2:
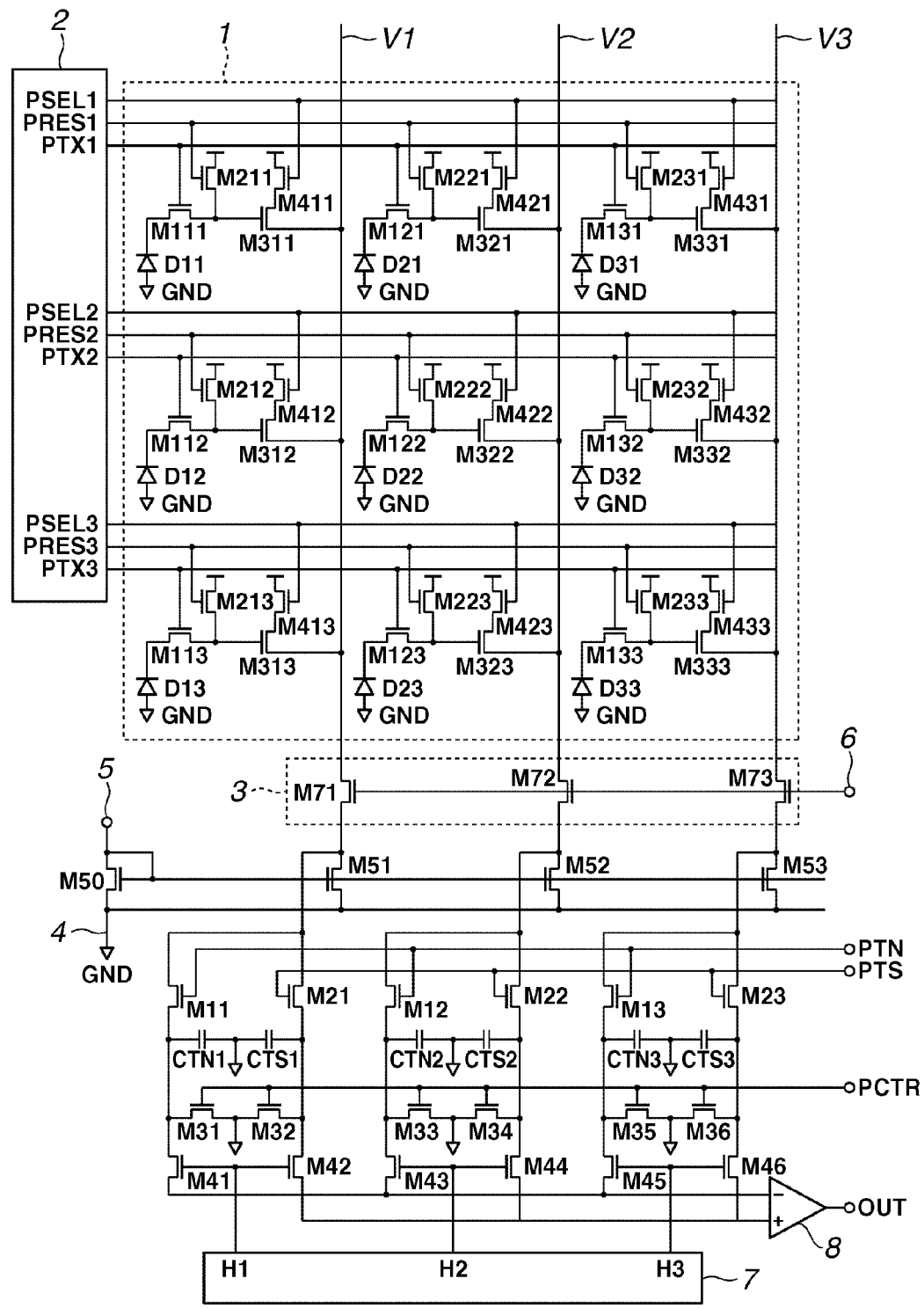
FIG. 2 is a circuit diagram illustrating an internal arrangement of a CMOS solid-state image sensor.

FIG. 2 illustrates an internal arrangement of a CMOS solid-state image sensor, as a practical example of the image sensor 103 shown in FIG. 1. For example, the solid-state image sensor includes numerous circuit elements formed on a single semiconductor substrate 1, such as single crystal silicon, according to a manufacturing technique for semiconductor integrated circuits.

For simplification, FIG. 2 shows a pixel array arranged in a matrix pattern composed of 3 rows and 3 columns. However, the pixel array is not limited to the arrangement and size shown in FIG. 2. An exemplary arrangement of the image sensor according to the present embodiment will be described with reference to FIG. 2.

Photoelectric conversion sections D11 through D33 are configured to generate photoelectric signal charge. Each of the photoelectric conversion sections D11 through D33 is grounded at its anode. The photoelectric conversion sections D11 through D33 have cathodes connected to source terminals of corresponding transfer metal-oxide semiconductor (MOS) transistors M111 through M133, respectively. Each transfer MOS transistor can transfer photoelectric signal charge stored in an associated photoelectric conversion section.

The transfer MOS transistor M111 has a gate terminal connected to a first row selection line (vertical scanning line) PTX1 which extends in the horizontal direction. The transfer MOS transistors M121 and M131 of other pixel cells, disposed in the same pixel row as the transfer MOS transistor M111, have gate terminals commonly connected to the first row selection line PTX1.

Furthermore, the transfer MOS transistors M111 through M133 have drain terminals connected to gate terminals of corresponding amplification MOS transistors M311 through M333, respectively. The amplification MOS transistors M311 through M333 have gate terminals connected to source terminals of reset MOS transistors M211 through M233, respectively. Each of the reset MOS transistors M211 through M233 has a reset function. The reset MOS transistors M211 through M233 have drain terminals connected to a reset power source.

Furthermore, the amplification MOS transistors M311 through M333 have drain terminals connected to corresponding selection MOS transistors M411 through M433, respectively. Each of the selection MOS transistors M411 through M433 can supply a power source voltage.

The reset MOS transistor M211 has a gate terminal connected to a second row selection line (vertical scanning line) PRES1 which extends in the horizontal direction. The reset MOS transistors M221 and M231 of other pixel cells, disposed in the same pixel row as the reset MOS transistor M211, have gate terminals commonly connected to the second row selection line PRES1.

The selection MOS transistor M411 has a gate terminal connected to a third row selection line (vertical scanning line) PSEL1 which extends in the horizontal direction. The selection MOS transistors M421 and M431 of other pixel cells, disposed in the same pixel row as the selection MOS transistor M411, have gate terminals commonly connected to the third row selection line PSEL1.

The first row selection line PTX1, the second row selection line PRES1, and the third row selection line PSEL1 are connected to a vertical scanning circuit block 2, which supplies a signal voltage to each selection line at predetermined operation timing as described later.

The pixel cells disposed in other pixel rows shown in FIG. 2 have a similar arrangement, and similar row selection lines are provided for the pixel cells. For example, row selection lines PTX2, PRES2, and PSEL2 are provided for pixel cells on the second row, and row selection lines PTX3, PRES3, and PSEL3 are provided for pixel cells on the third row. The vertical scanning circuit block 2 can supply signal voltages to respective row selection lines.

The amplification MOS transistor M311 has a source terminal connected to a vertical signal line V1 which extends in the vertical direction. The amplification MOS transistors M312 and M313 of other pixel cell, disposed in the same pixel column as the amplification MOS transistor M311, have source terminals commonly connected to the vertical signal line V1. The vertical signal line V1 is connected to a load MOS transistor M51 (i.e., a load element) via a grounded-gate MOS transistor M71. The MOS transistor M71 constitutes part of a constant-voltage unit 3.

The grounded-gate MOS transistor M71 has a gate terminal connected to a voltage input terminal 6 that can supply a gate voltage. As shown in FIG. 2, amplification MOS transistors, a grounded-gate MOS transistor, and a load MOS transistor are connected to each of the remaining vertical signal lines V2 and V3.

For example, source terminals of amplification MOS transistors M321 through M323, a grounded-gate transistor M72, and a load MOS transistor M52 are connected to pixel cells on the second column. Similarly, source terminals of amplification MOS transistors M331 through M333, a grounded-gate transistor M73, and a load MOS transistor M53 are connected to pixel cells on the third column.

Furthermore, the load MOS transistors M51 through M53 have source terminals connected to a common ground (GND) line 4 and gate terminals connected to a gate terminal of an input MOS transistor M50 and to a voltage input terminal 5.

The vertical signal line V1 is connected via a noise signal transfer switch M11 to a capacitor CTN1 that can temporarily store a noise signal, and is also connected via a photoelectric signal transfer switch M21 to a capacitor CTS1 that can temporarily store a photoelectric signal. The noise signal holding capacitor CTN1 and the photoelectric signal holding capacitor CTS1 are grounded at their opposite terminals.

A connecting point of the noise signal transfer switch M11 and the noise signal holding capacitor CTN1 is grounded via a holding capacity reset switch M31, and is also connected via a horizontal transfer switch M41 to one input terminal of a differential circuit block 8.

Similarly, a connecting point of the photoelectric signal transfer switch M21 and the photoelectric signal holding capacitor CTS1 is grounded via a holding capacity reset switch M32, and is also connected via a horizontal transfer switch M42 to the other input terminal of the differential circuit block 8. The differential circuit block 8 can output a differential signal representing a difference between the input photoelectric signal and the input noise signal.

The horizontal transfer switches M41 and M42 have gate terminals commonly connected to a column selection line H1 of a horizontal scanning circuit block 7. As shown in FIG. 2, similar reading circuits are provided for the remaining vertical signal lines V2 and V3.

Furthermore, the noise signal transfer switches M11 through M13 of respective pixel columns have gate terminals commonly connected to a terminal PTN. The photoelectric signal transfer switches M21 through M23 of respective columns have gate terminals commonly connected to a terminal PTS. As described later, signal voltages are supplied to the terminals PTN and PTS at predetermined operation timing.

Figure 3:
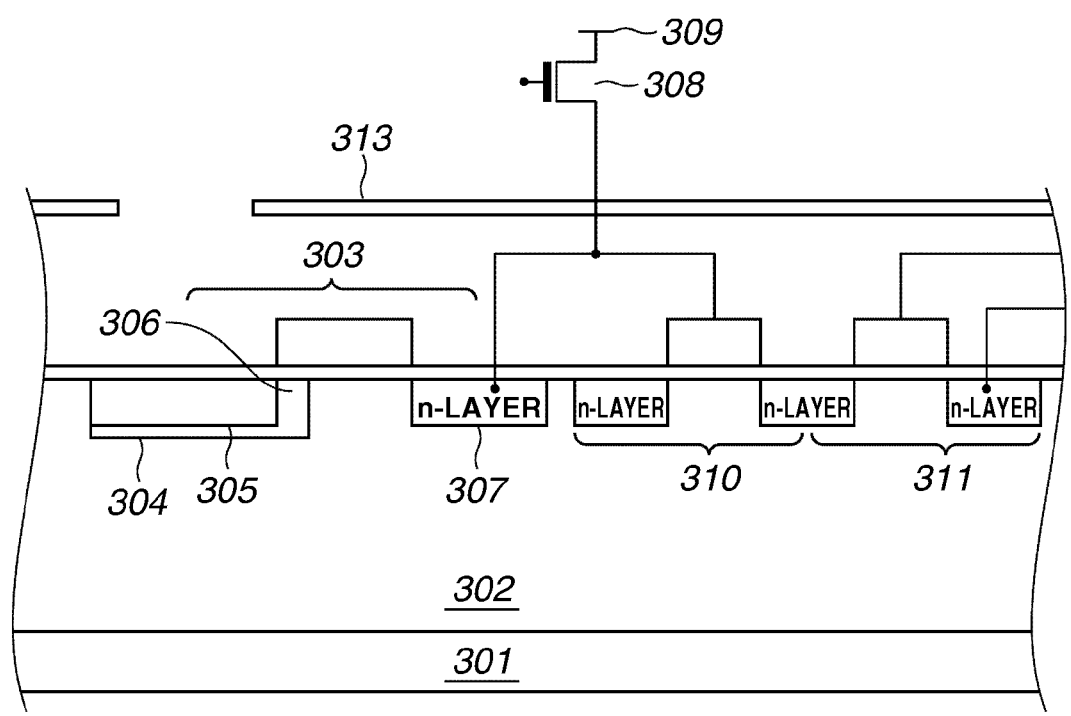
FIG. 3 is a cross-sectional diagram illustrating a pixel structure according to an exemplary embodiment.

FIG. 3 illustrates a cross-sectional structure of one pixel according to an exemplary embodiment. In FIG. 3, a photoelectric conversion element includes a p-type well 302 formed on an n-type substrate 301, an n-layer 304 of the photoelectric conversion element formed on the p-type well 302, and a p-layer 305 of the photoelectric conversion element formed on the n-layer 304. The p-layer 305 has a higher density at its surface region.

A gate region of a transfer MOS transistor 303 is formed via an insulating layer on a side surface of the photoelectric conversion section. A bypass region 306, continuously extending from the n-layer 304 of the photoelectric conversion section, is formed between the gate region of the transfer MOS transistor 303 and the side surface of the photoelectric conversion section. Furthermore, a floating diffusion layer (FD) 307 is formed beneath the side surface of the gate region of the transfer MOS transistor 303. The floating diffusion layer 307 is a charge holding region.

The floating diffusion region 307 is connected to the gate terminal of an amplification MOS transistor 310 of an output circuit. A reset MOS transistor 308, which resets the floating diffusion layer 307, has a source terminal connected to the floating diffusion layer 307 and a drain terminal connected to a reset power source 309.

The amplification MOS transistor 310 produces an amplified output signal which is taken out via a pixel selection MOS transistor 311. An aluminum light-shielding plate 313 is provided above the element, so that no light can reach a region other than the region of each photoelectric conversion section.

The floating diffusion layer 307 receives a saturated light quantity signal overflowing a photoelectric conversion section in the same pixel as well as saturated light quantity signals overflowing photoelectric conversion sections in the neighboring pixels.

Next, with reference to FIGS. 2 and 4, an ordinary signal reading operation will be described. Prior to reading photoelectric signal charge from respective photoelectric conversion sections D11 through D33, the vertical scanning circuit block 2 supplies a high-level gate potential via the second row selection line PRES1 to the reset MOS transistors M211 through M231. Thus, the gate potentials of respective amplification MOS transistors M311 through M331 are reset to the potential of the reset power source. Then, the vertical scanning circuit block 2 supplies a low-level gate potential via the second row selection line PRES1 to the reset MOS transistors M211 through M231.

Subsequently, the vertical scanning circuit block 2 supplies a high-level gate potential via the third row selection line PSEL1 to the selection MOS transistors M411 through M431. Then, the terminal PTN supplies a high-level gate potential to the noise signal transfer switches M11 through M13. With the above operation, the noise signal holding capacitors CTN1 through CTN3 can store reset signals including reset noises (i.e., noise signals).

Next, the terminal PTN supplies a low-level gate potential to the noise signal transfer switches M11 through M13. Next, the vertical scanning circuit block 2 supplies a high-level gate potential via the first row selection line PTX1 to the transfer MOS transistors M111 through M131. Thus, the photoelectric signal charges of the photoelectric conversion sections D11 through D33 are transferred to gate terminals of the amplification MOS transistors M311 through M331.

Then, the vertical scanning circuit block 2 supplies a low-level gate potential via the first row selection line PTX1 to the transfer MOS transistors M111 through M131. Subsequently, the terminal PTS supplies a high-level gate potential to the photoelectric signal transfer switches M21 through M23. With the above operation, the photoelectric signal holding capacitors CTS1 through CTS3 can store the photoelectric signals.

Next, the terminal PTS supplies a low-level gate potential to the photoelectric signal transfer switches M21 through M23. With the above operations, the noise signals and the photoelectric signals of the pixel cells aligned in the first row can be held in the noise signal holding capacitors CTN1 through CTN3 and the photoelectric signal holding capacitors CTS1 through CTS3, respectively.

Next, the vertical scanning circuit block 2 supplies a high-level gate potential via the second row selection line PRES1 to the reset MOS transistors M211 through M231, and supplies a high-level gate potential via the first row selection line PTX1 to the transfer MOS transistors M111 through M131. Thus, the photoelectric signal charges stored in the photoelectric conversion sections D11 through D33 are reset.

Subsequently, the horizontal scanning circuit block 7 successively supplies a high-level gate potential to the horizontal transfer switches M41 through M46 of respective columns via the column selection lines H1 through H3. The voltages held in the noise holding capacitors CTN1 through CTN3 and the photoelectric signal holding capacitors CTS1 through CTS3 are successively supplied to the differential circuit block 8.

The differential circuit block 8 successively outputs, from its output terminal OUT, an output signal representing a difference between the photoelectric signal and the noise signal. With the above processing, the reading operation for the pixel cells aligned in the first row can be accomplished.

Subsequently, prior to reading photoelectric signal charges of the second row, a terminal PCTR supplies a high-level gate potential to the reset switches M31 through M36 of the noise signal holding capacitors CTN1 through CTN3 and the photoelectric signal holding capacitors CTS1 through CTS3. Thus, the noise signal holding capacitors CTN1 through CTN3 and the photoelectric signal holding capacitors CTS1 through CTS3 are reset to the GND potential. In the same manner, the signals of the pixel cells aligned in the second and third rows can be successively read out in response to control signals supplied from the vertical scanning circuit block 2. Thus, the reading operation for all pixel cells can be accomplished.

Next, a saturated light quantity signal reading operation is described with reference to the timing chart shown in FIG. 5. First, storage of photoelectric charge is performed before starting a reading operation. In an ordinary reading operation, a photoelectric conversion section receives light for the storage of photoelectric charge. The floating diffusion layer 307 is constantly reset during a light receiving period.

However, a reading operation for an electric charge overflowing the floating diffusion layer 307 is carried out without resetting the floating diffusion layer 307. When the storage period ends, the photoelectric conversion section is shielded from light and a reading operation starts.

First, the terminal PTS supplies a high-level gate potential to the photoelectric signal transfer switches M21 through M23. In response to the high-level gate potential, the saturated light quantity signal stored in the floating diffusion layer 307 is read out to the photoelectric signal holding capacitors CTS1 through CTS3.

Next, the terminal PTS supplies a low-level gate potential to the photoelectric signal transfer switches M21 through M23. Subsequently, the second row selection line PRES1 supplies a high-level gate potential to the reset MOS transistors M211 through M231. The floating diffusion layer 307 is thus reset to the reset power source. Then, the second row selection line PRES1 supplies a low-level gate potential to the reset MOS transistors M211 through M231. Next, the terminal PTN supplies a high-level gate potential to the noise signal transfer switches M11 through M13. In response to the high-level gate potential, the noise signal is read out to the noise signal holding capacitors CTN1 through CTN3.

Through the above-described operation, the noise signals and the saturated light quantity signals from the pixel cells aligned in the first row can be held in the noise signal holding capacitors CTN1 through CTN3 and the photoelectric signal holding capacitors CTS1 through CTS3 connected to respective pixel columns.

Then, the terminal PTN supplies a low-level gate potential to the noise signal transfer switches M11 through M13. Next, the second row selection line PRES1 supplies a high-level gate potential to the reset MOS transistors M211 through M231. The reset MOS transistors M211 through M231 are thus reset.

Subsequently, the horizontal scanning circuit block 7 successively supplies, via the column selection lines H1 through H3, high-level gate potentials to the horizontal transfer switches M41 through M46 of respective columns. As a result, the voltages held in the noise holding capacitors CTN1 through CTN3 and the photoelectric signal holding capacitors CTS1 through CTS3 are successively read out to the differential circuit block 8.

The differential circuit block 8 successively outputs, from the output terminal OUT, a signal representing a difference between the input saturated light quantity signal and the input noise signal. The A/D converter 105 receives the output signal (i.e., an analog signal) from the differential circuit block 8 and converts the received signal into a digital signal. The image memory 109 stores the converted digital signal.

Subsequently, the terminal PCTR supplies a high-level gate potential to the reset switches M31 through M36 of the noise signal holding capacitors CTN1 through CTN3 and the photoelectric signal holding capacitors CTS1 through CTS3 to reset them to the GND potential. Then, the photoelectric conversion section signal remaining in each photoelectric conversion section is read and A/D converted and finally stored in the image memory 109, in the same manner as the above-mentioned ordinary reading operation.

In this manner, a reading operation of the saturated light quantity signal and the photoelectric conversion section signal is carried out. However, an ordinary image sensor is not arranged to read a saturated light quantity signal.

Figure 4:
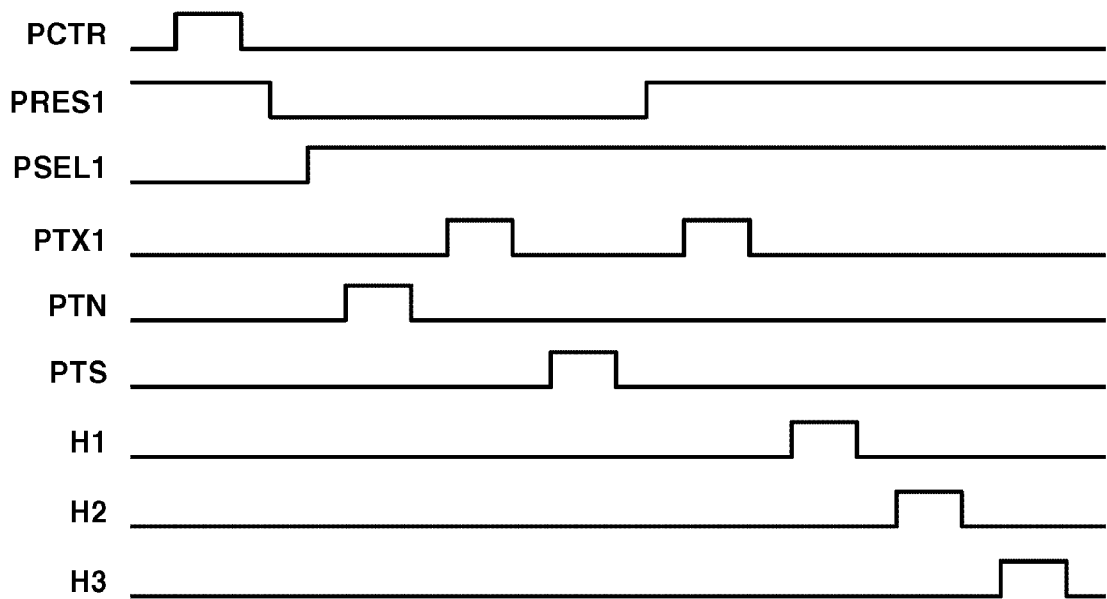
FIG. 4 is a timing chart illustrating an ordinary signal reading operation.

In an ordinary signal reading operation, as shown in FIG. 4, the floating diffusion layer 307 (i.e., the charge holding region) is once reset immediately before starting the read operation. Subsequently, the first row selection line PTX1 supplies a high-level potential to transfer the photoelectric conversion section signal. Namely, no serious problem arises in the ordinary reading operation even if color mixture is generated in the floating diffusion layer 307.

Figure 5:
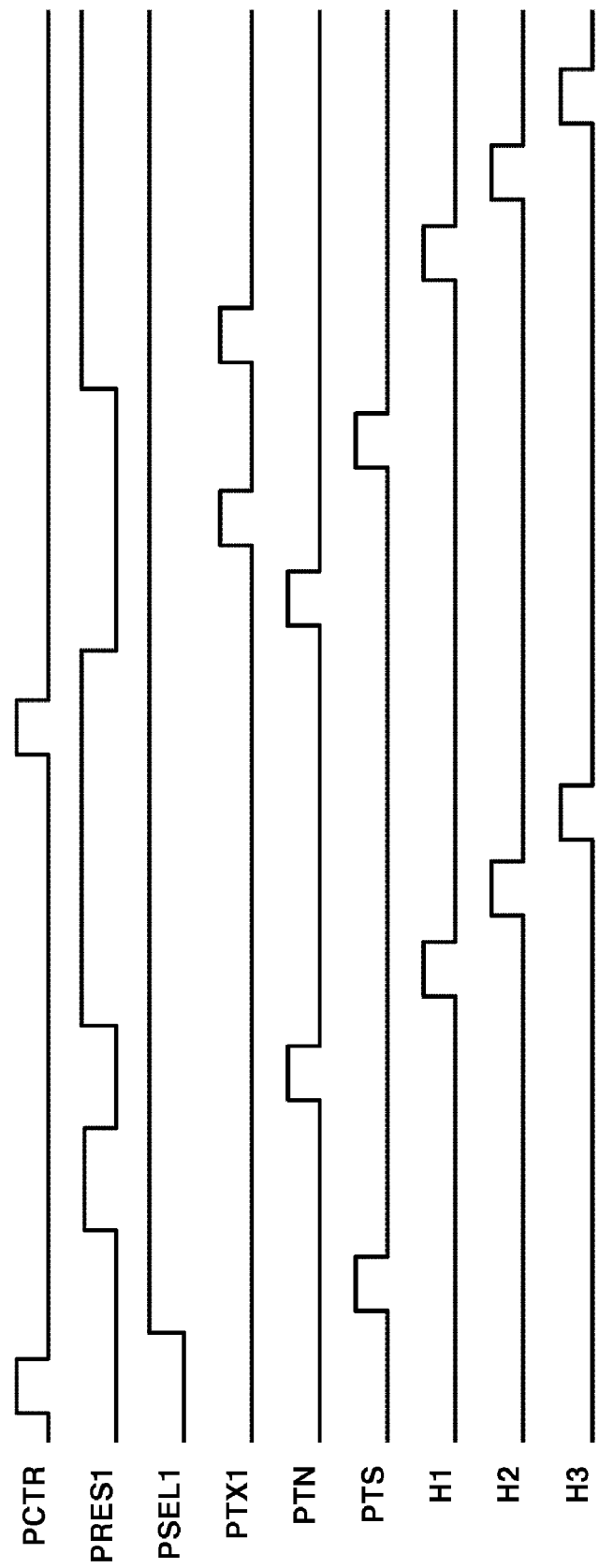
FIG. 5 is a timing chart illustrating a saturated light quantity signal reading operation.

However, in a case where enlargement of the dynamic range is performed by using the saturated light quantity signal overflowing into the floating diffusion layer 307, the reading operation is performed according to the above-described sequence shown in FIG. 5. In this case, the floating diffusion layer 307 cannot be reset immediately before starting the reading operation. Thus, a serious problem arises when color mixture is generated in the floating diffusion layer 307.

Although changing an image sensor structure may be useful to suppress the color mixture occurring in the floating diffusion layer 307, a long time and higher costs will be required. Moreover, a sufficient area for a light-receiving section may not be assured if the image sensor structure is changed to eliminate the color mixture.

In view of the above, the first exemplary embodiment can cause the signal processing circuit 108 to perform image processing for correcting color mixture while performing the above-mentioned reading operation for the saturated light quantity signal and photoelectric conversion section signal.

Thus, the first exemplary embodiment can correct color mixture without requiring a long time and higher costs and can obtain an image having a wide dynamic range free from color mixture.

Next, an exemplary algorithm for preventing any color mixture according to the present exemplary embodiment is described below in detail.

Figure 6:
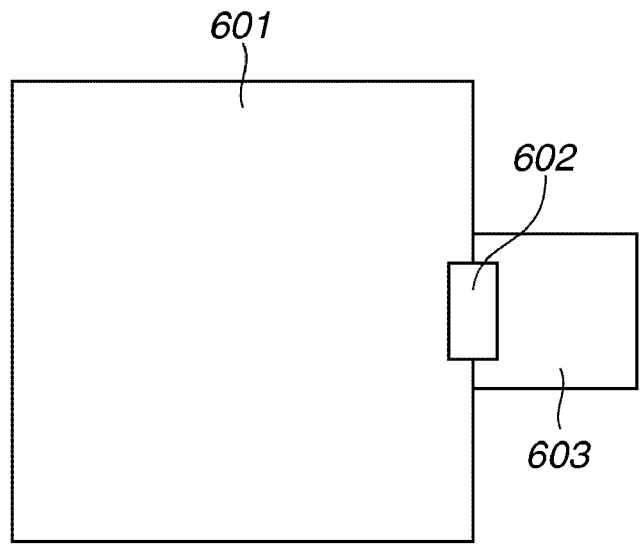
FIG. 6 is a plan view illustrating a pixel portion of an image sensor.

FIG. 6 is a plan view illustrating a pixel of an image sensor. A photoelectric conversion section 601 has one side surface connected via a transfer gate 602 to a floating diffusion layer section 603. The positional relationship between the photoelectric conversion section 601 and the floating diffusion layer section 603 is not limited to the example shown in FIG. 6. For example, the floating diffusion layer section 603 can be positioned at the other side of the photoelectric conversion section 601.

Figure 7:
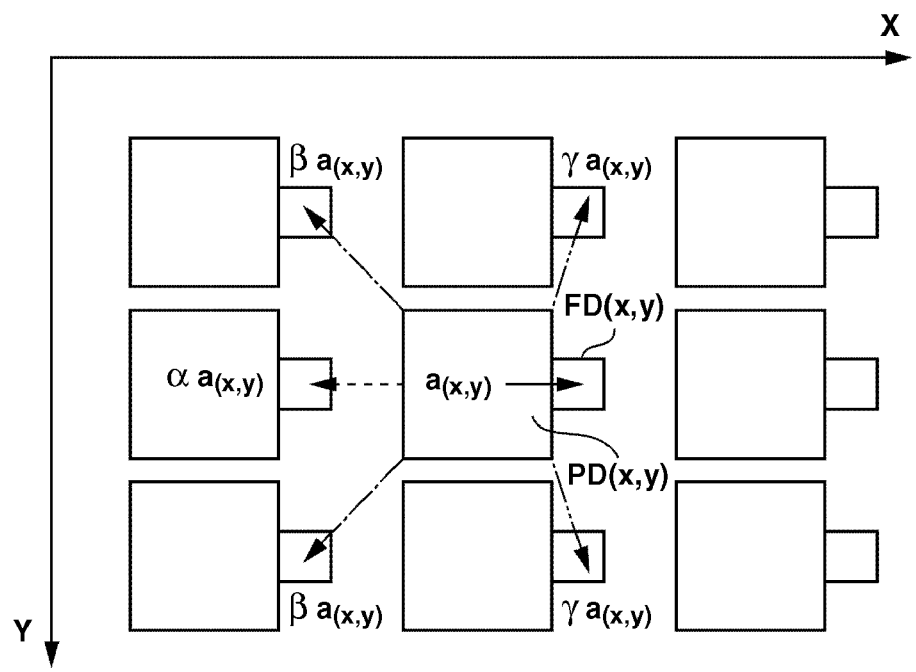
FIG. 7 illustrates an exemplary color mixture generation mechanism.

FIG. 7 illustrates an exemplary color mixture generation mechanism. In FIG. 7, (x, y) represents the coordinates of a central pixel, PD(x, y) represents a pixel of a central photoelectric conversion section, and FD(x, y) represents a pixel of the floating diffusion layer. When the central photoelectric conversion section is saturated, overflow of electric charge occurs in directions shown in FIG. 7.

In FIG. 7, a(x, y) represents an overflow amount to a pixel FD(x, y), $\alpha$a(x, y) represents an overflow amount to a pixel FD(x−1, y), $\beta$a(x, y) represents an overflow amount to a pixel FD(x−1, y−1) and to a pixel FD(x−1, y+1), and $\gamma$a(x, y) represents an overflow amount to a pixel FD(x, y−1) and to a pixel FD(x, y−2).

The coefficients $\alpha$, $\beta$, and $\gamma$ can be measured beforehand. The present exemplary embodiment simplifies the description by taking symmetry into consideration. Thus, the overflow amount to the pixel FD(x−1, y−1) is equal to the overflow amount to the pixel FD(x−1, y+1). The overflow amount to the pixel FD(x, y−1) is equal to the overflow amount to the pixel FD(x, y−2). However, if the image sensor structure has no symmetry, the coefficients can be differently determined.

Figure 8:
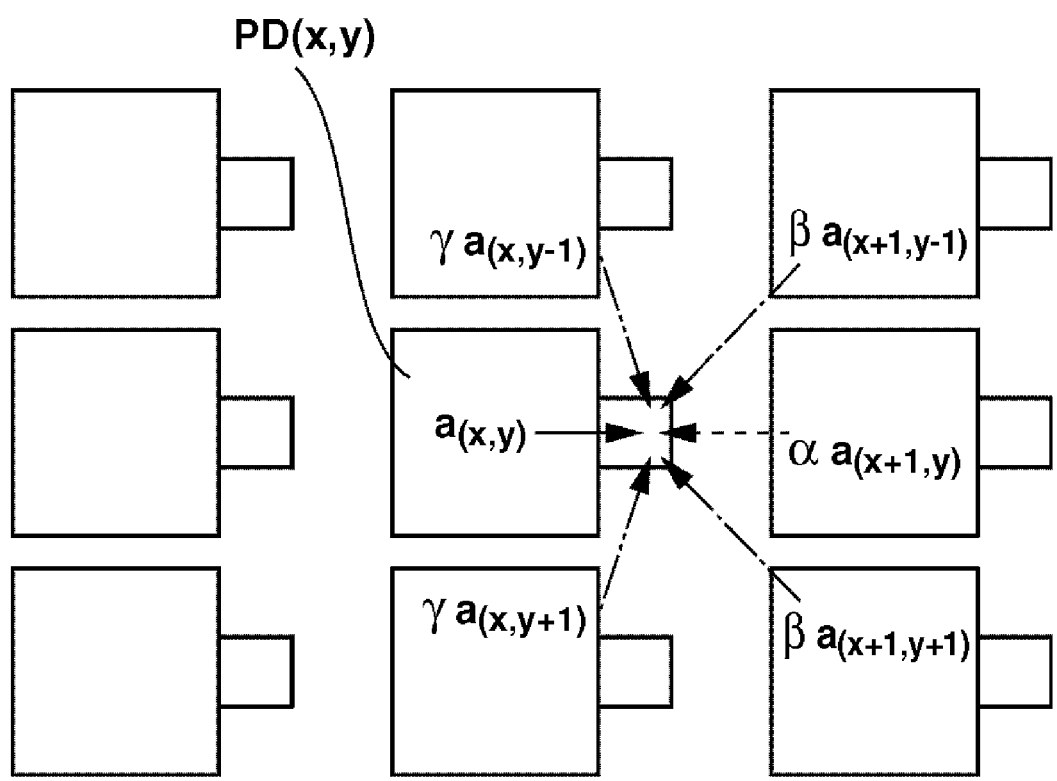
FIG. 8 illustrates overflow of electric charge flowing into a floating diffusion layer according to the first exemplary embodiment.

When photoelectric conversion sections surrounding the pixel PD(x, y) are saturated, the overflow of electric charge into the pixel FD(x, y) occurs in directions shown in FIG. 8. As shown in FIG. 8, the pixel FD(x, y) receives a signal overflowing an associated pixel PD(x, y) as well as a signal overflowing a neighboring pixel PD. The overflow signal flowing from a neighboring pixel PD to the pixel FD(x, y) causes color mixture. Namely, an obtained signal FD(x, y) can be expressed by the following formula (1).

$$FD_{(x,y)} = a_{(x,y)} + \alpha a_{(x+1,y)} + \beta\{a_{(x+1,y+1)} + a_{(x+1,y-1)}\} + \gamma\{a_{(x,y+1)} + a_{(x,y-1)}\} \quad (1)$$

In the formula (1), only the first term a(x, y) on the right side is a signal to be obtained. All of other components are color mixture components. In other words, a(x, y) can be obtained by removing the color mixture components.

Figure 9:
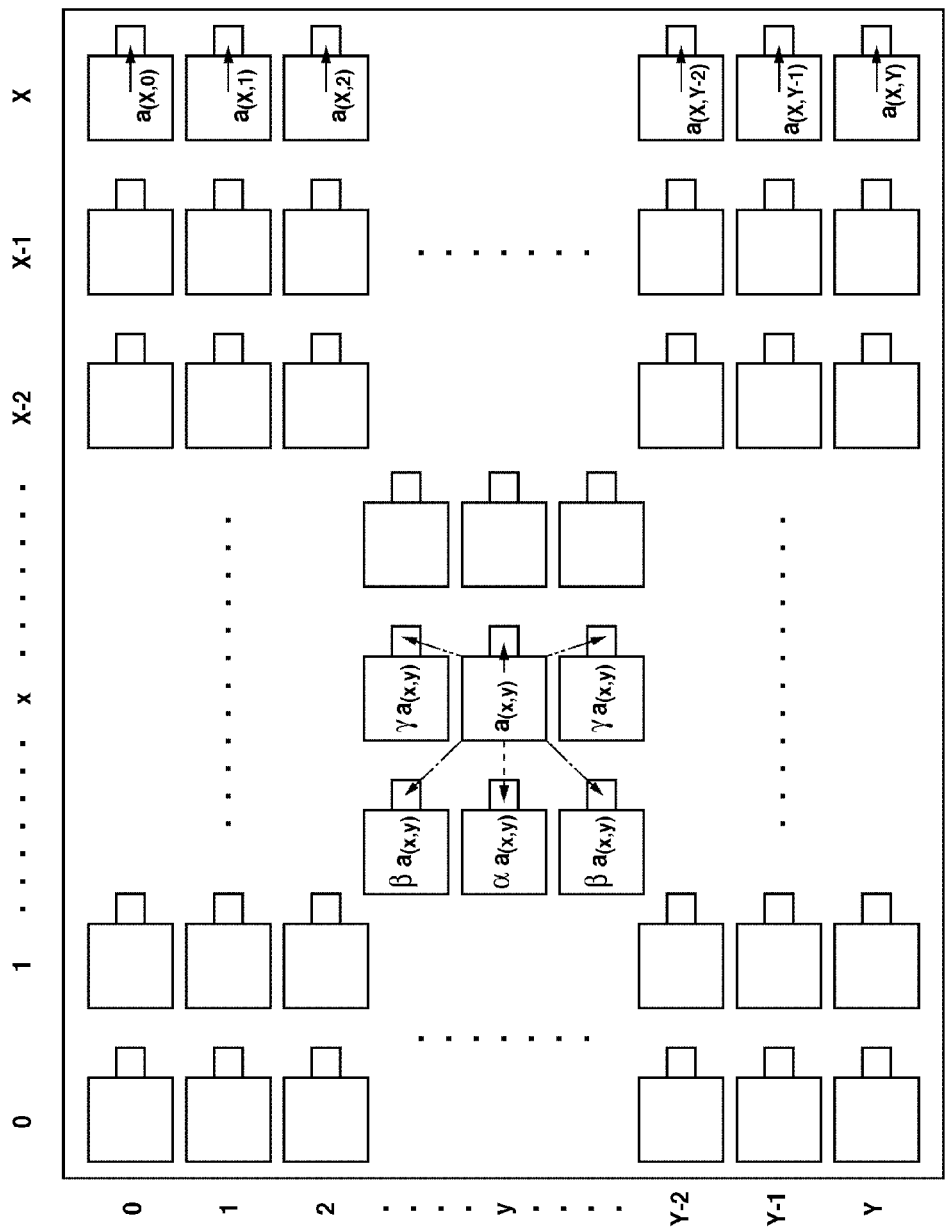
FIG. 9 illustrates an overall arrangement of an image sensor.
Figure 10:
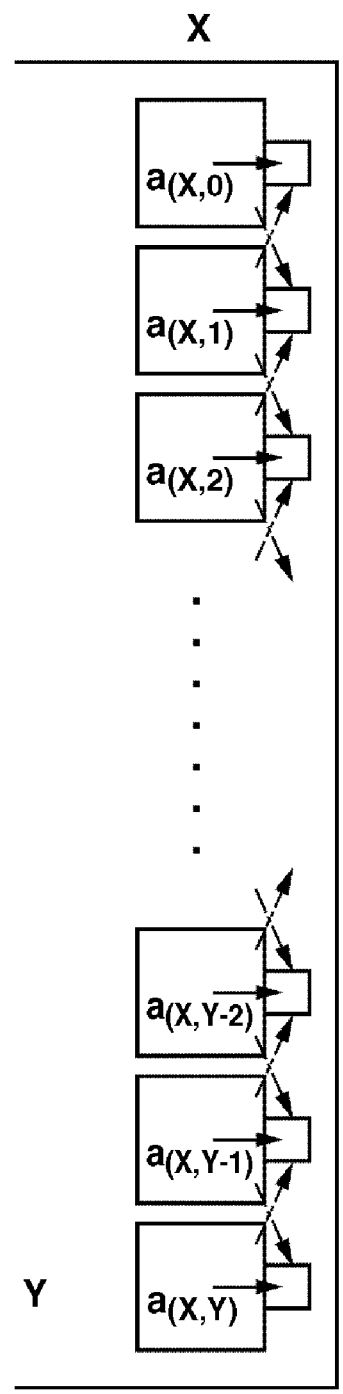
FIG. 10 is an enlarged illustration of a rightmost pixel array (x=X).

FIG. 9 illustrates an overall arrangement of an image sensor. As shown in FIG. 9, pixel coordinates in the horizontal direction change from 0 to X and the pixel coordinates in the vertical direction change from 0 to Y. The region defined by x<0, x>X, y<0, and y>Y is a region including no pixels or an optical black (OB) region. Namely, a floating diffusion layer of a pixel in the rightmost array (x=X) receives no color mixture signal from the next array (x=X+1). FIG. 10 is an enlarged illustration of the rightmost pixel array (x=X).

To establish the relationship shown in FIG. 10, FD signals at x=X (y=0 through Y) satisfy the following formulas (2) through (7).

$$FD_{(X,0)} = a_{(X,0)} + \gamma a_{(X,3)} \quad (2)$$

$$FD_{(X,3)} = a_{(X,3)} + \gamma \{a_{(X,0)} + a_{(X,2)}\} \quad (3)$$

$$FD_{(X,2)} = a_{(X,1)} + \gamma \{a_{(X,1)} + a_{(X,3)}\} \quad (4)$$

...

$$FD_{(X,Y-2)} = a_{(X,Y-2)} + \gamma \{a_{(X,Y-3)} + a_{(X,Y-4)}\} \quad (5)$$

$$FD_{(X,Y-1)} = a_{(X,Y-1)} + \gamma \{a_{(X,Y-2)} + a_{(X,Y)}\} \quad (6)$$

$$FD_{(X,Y)} = a_{(X,Y)} + \gamma a_{(X,Y-1)} \quad (7)$$

The formula (7) is a function including unknown components $a(X, Y)$ and $a(X, Y-1)$. The formula (7) can be rewritten to the following formula (8).

$$a_{(X,Y)} = \gamma a_{(X,Y-1)} - FD_{(X,Y)} \quad (8)$$

When the formula (8) is input to the formula (6), the component $a(X, Y)$ can be erased. The formula (6) can be expressed as a function including components $a(X, Y-1)$ and $a(X, Y-2)$. Then, the component $a(X, Y-1)$ can be obtained by deforming the formula and can be input to the formula (5). By repeating the above-described rewriting and substitution, the formula (3) can be expressed as a function including components $a(X, 0)$ and $a(X, 1)$. Then, the components $a(X, 0)$ and $a(X, 1)$ can be obtained based on the simultaneous linear equations (2) and (3).

On the contrary, when the components $a(X, 0)$ and $a(X, 1)$ are obtained, a component $a(X, 2)$ can be derived from the formula (3). When the component $a(X, 2)$ is obtained, a component $a(X, 3)$ can be derived from the formula (4). Then, a component $a(X, Y)$ can be finally obtained. Thus, all components $a(X, 0)$ through $a(X, Y)$ of the pixel array in the rightmost column can be obtained.

Figure 11:
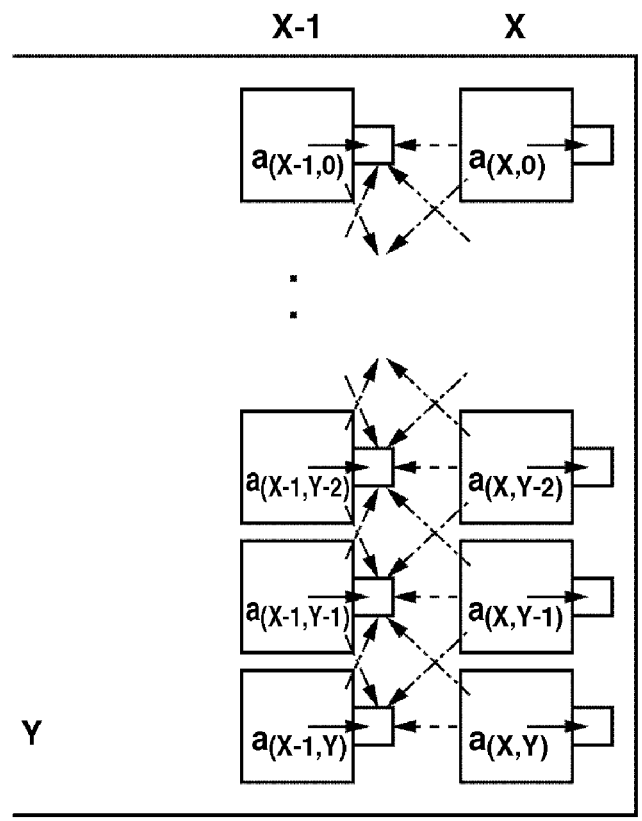
FIG. 11 is an enlarged illustration of pixel arrays corresponding to x=X and x=X−1.

Next, color mixture in the second column from the right, i.e., the pixel column corresponding to x=X−1, is described. FIG. 11 is an enlarged illustration of the pixel arrays corresponding to x=X and x=X−1. The FD signal of the "x=X−1" column is different from the FD signal of the "x=X" column in that the color mixture from the rightmost column PD is considered. For example, the signal of the pixel FD(X−1, 0) is expressed by the following formula (9).

$$FD_{(X-1,0)} = a_{(X-1,0)} + \alpha a_{(X,0)} + \beta a_{(X,1)} + \gamma a_{(X-1,1)} \quad (9)$$

The first term $a(X-1, 0)$ on the right side represents an amount overflowing from the pixel PD to the pixel FD which is to be obtained. Furthermore, the second term $\alpha a(X, 0)$ represents an overflow amount from the pixel PD(X, 0). The third term $\beta a(X, 1)$ represents an overflow amount from the pixel PD(X, 1). The fourth term $\gamma a(X-1, 1)$ represents an overflow amount from the pixel PD(X−1, 1).

In the formula (9), components $a(X, 0)$ and $a(X, 1)$ are already obtained as the overflow amount in the rightmost column, and only components $a(X-1, Y)$ and $a(X-1, 1)$ are unknown. Accordingly, similar to the column x=X, all of components $a(X-1, 0)$ through $a(X-1, Y)$ of the pixel array in the "x=X−1" column can be obtained by repeating rewriting and substitution of the formula.

Similarly, an overflow amount from the pixel PD to the pixel FD in every pixel can be obtained by successively executing the above-described calculations until x becomes 0 (x=0). Then, the overflow amount can be used to correct the color mixture generated between the photoelectric conversion section and the floating diffusion layer.

In short, an image including less color mixture can be obtained by adding the obtained corrected saturated light quantity signal and the photoelectric conversion section signal. If necessary, an appropriate gain can be multiplied with the corrected saturated light quantity signal before addition.

The signal processing circuit 108 in the imaging apparatus shown in FIG. 1 executes the above-mentioned image processing. The nonvolatile memory 115 stores the correction coefficient $\alpha$, $\beta$, and $\gamma$ beforehand. When a power source of the imaging apparatus is turned on, the correction coefficient $\alpha$, $\beta$, and $\gamma$ are loaded in the volatile memory 116.

When a shooting operation is performed, an FD signal is read according to the above-described reading method and stored in the image memory 109. A pixel to which correction processing is applied is read from the image memory 109. The system control section 114 reads appropriate correction coefficients from the volatile memory 116. Then, the signal processing circuit 108 executes the above-mentioned calculations.

In the first exemplary embodiment, as shown in FIG. 6, the floating diffusion layer 603 is positioned at the right side of the photoelectric conversion section 601. Alternatively, the floating diffusion layer 603 can be positioned at the left side of the photoelectric conversion section 601. In this case, the above-mentioned calculations can be executed from the left edge (x=0).

Furthermore, the floating diffusion layer 603 can be positioned at the upper or lower side. In this case, the above-mentioned calculations can be executed from the upper edge (y=0) or the lower edge (y=Y).

Moreover, the processing of the first exemplary embodiment can be executed by an imaging apparatus (e.g., a camera) or by a personal computer with a dedicated application.

Second Exemplary Embodiment

Next, a second exemplary embodiment of the present invention is described. The second exemplary embodiment is different from the first exemplary embodiment in that some of saturation signals overflowing in six directions are neglected depending on the direction of flow. In many cases, a satisfactory processing result can be obtained using only the overflow amounts in an FD of a target pixel and an FD of a neighboring pixel (e.g., the left neighboring pixel in the first exemplary embodiment).

Hence, the second exemplary embodiment executes image processing considering only two floating diffusion layers positioned at both sides of the saturated photoelectric conversion section. The second exemplary embodiment can speedily accomplish the correction processing.

Figure 12:
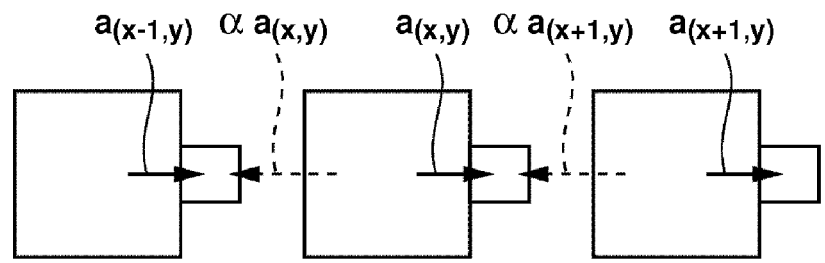
FIG. 12 illustrates overflow of electric charge flowing into a floating diffusion layer according to a second exemplary embodiment.

The second exemplary embodiment reads the saturated light quantity signal and the photoelectric conversion section signal in a similar manner as in the first exemplary embodiment. FIG. 12 illustrates a color mixture model based on which the second exemplary embodiment executes calculations.

As the second exemplary embodiment considers only two floating diffusion layers positioned at both sides of the saturated photoelectric conversion section as shown in FIG. 12, the pixel FD(x, y) can be expressed by the following formula (10).

$$FD_{(x,y)} = a_{(x,y)} + \alpha a_{(x+1,y)} \quad (10)$$

Then, the formula (10) can be rewritten into the following formula (11) because no overflow from the neighboring PD is considered in the pixel column corresponding to x=X.

$$FD_{(X,y)} = a_{(X,y)} \quad (11)$$

In short, a value to be obtained can be directly obtained. Thus, a component a(X−1, y) can be obtained based on a component a(X, y). Similarly, a component a(X−2, y) can be obtained based on a component a(X−1, y). Finally, a component a(0,y) can be obtained. By executing the above-mentioned calculations for all pixel rows (y=0 through Y), all pixels can obtain FD values having been subjected to color mixture correction.

As described above, the second exemplary embodiment requires no two-dimensional calculations and accordingly can accomplish the correction processing. The second exemplary embodiment is useful when being applied to an imaging apparatus (e.g., a camera) because a processing load of the signal processing circuit 108 can be greatly reduced.

Third Exemplary Embodiment

Next, a third exemplary embodiment of the present invention is described. The third exemplary embodiment is different from the second exemplary embodiment in that the approximation is further enhanced.

Figure 13:
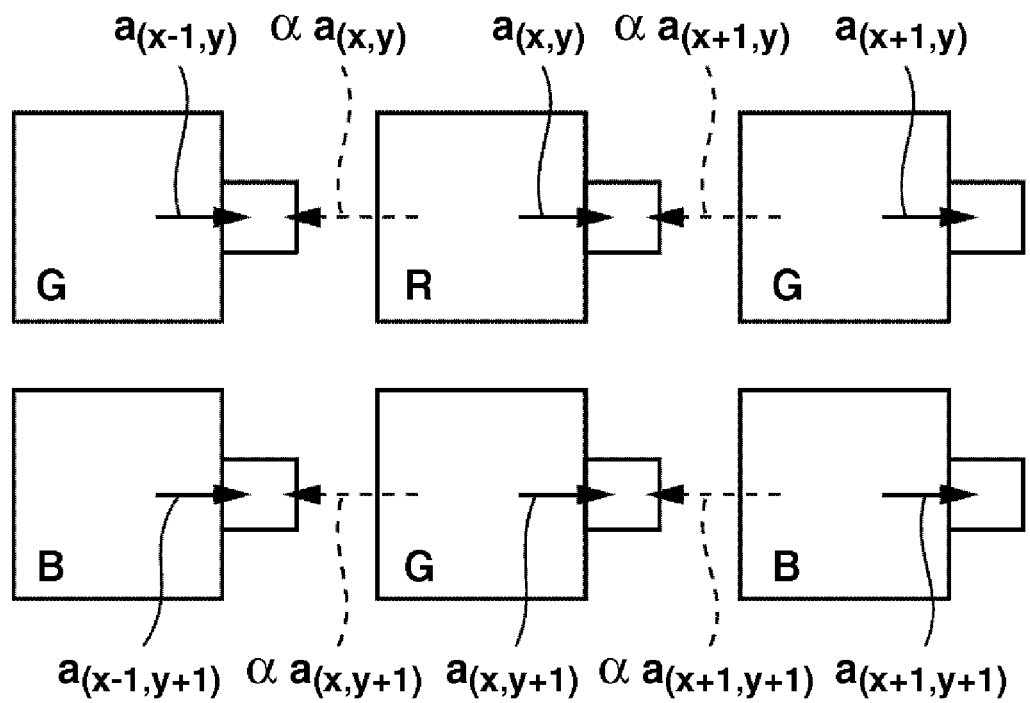
FIG. 13 illustrates overflow of electric charge flowing into a floating diffusion layer according to a third exemplary embodiment.

The approximation used in the third exemplary embodiment is based on a presumption that a neighboring same-color pixel has a same-value signal. In this case, the calculation can be more simplified. The third exemplary embodiment is described based on an image sensor using a Bayer array including a unit matrix of 2×2. FIG. 13 illustrates an exemplary Bayer array which can be expressed by the following formula (12).

$$a_{(x-1,y)} = a_{(x+1,y)} \quad (12)$$

More specifically, two pixels FD(x−1, y) and FD(x, y) satisfy the following simultaneous linear equations (13). Each of components a(x, y) and a(x−1, y) can be obtained.

$$FD_{(x-1,y)} = a_{(x-1,y)} + \alpha a_{(x,y)}$$

$$FD_{(x,y)} = a_{(x,y)} \alpha a_{(x-1,y)} \quad (13)$$

The approximation used in the third exemplary embodiment requires only a target pixel and a neighboring pixel. In other words, the approximation according to the third exemplary embodiment does not require all of the pixels in the same column. Therefore, the present exemplary embodiment can effectively increase the processing speed, for example, by neglecting every non-saturated photoelectric conversion section or other portions requiring no corrections.

Figure 14:
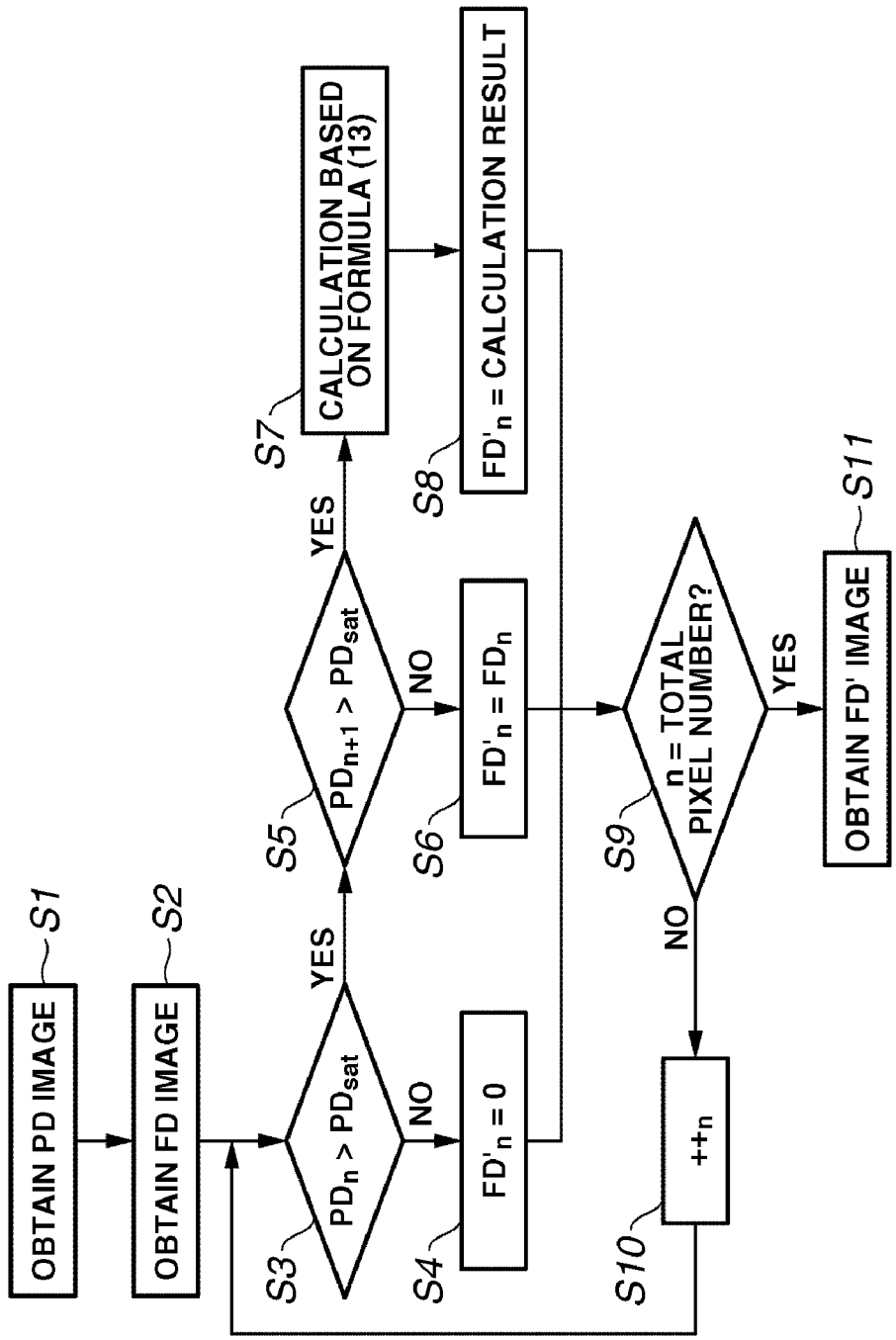
FIG. 14 is a flowchart illustrating an algorithm of the image processing performed in the third exemplary embodiment.

The present exemplary embodiment executes the above-mentioned approximation using the following algorithm while identifying a portion where a photoelectric conversion section is not saturated. FIG. 14 is a flowchart illustrating an algorithm of the image processing performed in the third exemplary embodiment, wherein PDn represents an n-th PD pixel and FDn represents an n-th FD pixel. Furthermore, FD'n represents a corrected FDn signal. Moreover, PDsat represents an output value produced when the PD is saturated.

First, a PD image and an FD image are obtained using the aforementioned reading method and stored in the image memory 109 (refer to steps S1 and S2). Next, the PD image is successively scanned from its leading side (n=0). A read PDn signal is compared with the PDsat value (refer to step S3). Then, if the read PDn signal is equal or less than the PDsat value (i.e., NO in step S3), it is determined that the PDn signal is not saturated and the value of FD'n is equal to 0 (refer to step S4). On the other hand, if the read PDn signal is greater than the PDsat value (i.e., YES in step S3), the processing flow proceeds to step S5.

In step S5, a PDn+1 signal of a neighboring PD pixel is compared with the PDsat value. Then, if the PDn+1 signal is equal to or less than the PDsat value (i.e., NO in step S5), it is determined that the PDn+1 pixel is not saturated and no color mixture is generated. Therefore, the value of FD'n is equal to the FDn value (refer to step S6). On the other hand, if the PDn+1 signal is greater than the PDsat value (i.e., YES in step S5), the simultaneous liner equations defined in the formula (13) are solved (refer to step S7). Then, it is determined that the value of FD'n is equal to the calculation result (refer to step S8).

The above-described processing is repeatedly executed for all pixels until "n" reaches the total pixel number (refer to steps S9 and S10). When the correction processing for all pixels is completed (i.e., YES in step S9), an FD' image resulting from the FD signal having been subjected to the correction can be obtained (refer to step S11). The FD' image is then added to the PD image to obtain an image having a wide dynamic range and less color mixture at a higher brightness section.

Using the above-described algorithm can effectively reduce required calculation time for all pixels. Furthermore, forcibly cutting the FD signal of each non-saturated pixel PD (i.e., FD=0) can completely remove dark portion noises contained in each FD signal which may be caused by stray light or dark current. The above-described algorithm can be employed in the first or second exemplary embodiment if removal of dark portion noises is required.

Fourth Exemplary Embodiment

Next, a fourth exemplary embodiment of the present invention is described. The fourth exemplary embodiment uses a charge holding region other than the floating diffusion (FD) layer described in the first through third exemplary embodiments. An imaging apparatus according to the fourth exemplary embodiment is similar in arrangement to that described in the first to third exemplary embodiments (refer to FIG. 1).

Figure 15:
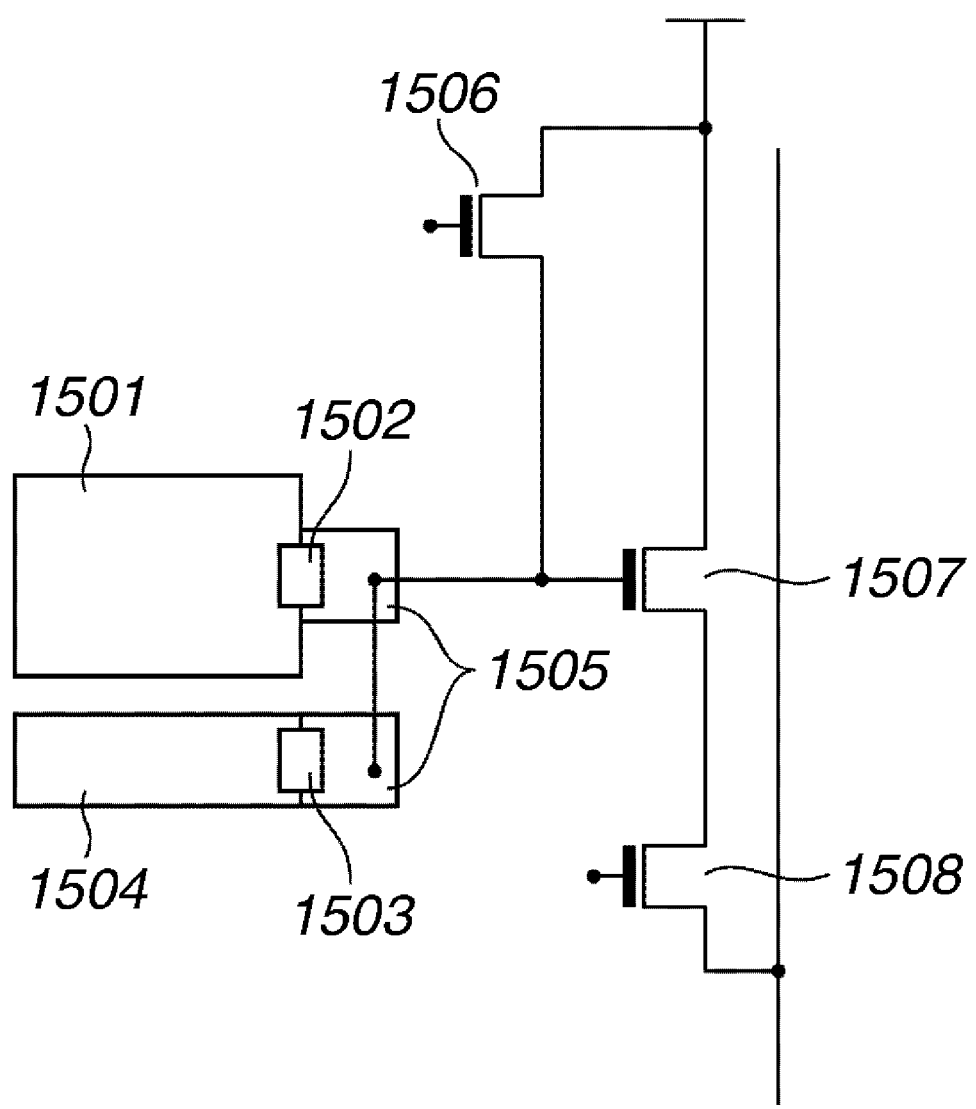
FIG. 15 illustrates a solid-state image sensor according to a fourth exemplary embodiment.

FIG. 15 illustrates a pixel arrangement of an image sensor according to the fourth exemplary embodiment. The image sensor shown in FIG. 15 includes plural pixels arrayed in a two-dimensional pattern.

Each pixel includes a transfer MOS field-effect transistor (MOSFET) 1502, a transfer MOSFET 1503, a reset MOSFET 1506, an amplification MOSFET 1507, and a pixel selection MOSFET 1508. The transfer MOSFET 1502 has source and drain terminals corresponding to a photoelectric conversion section 1501 and a floating diffusion layer section 1505. The transfer MOSFET 1503 has source and drain terminals corresponding to a charge holding region 1504 and the floating diffusion layer section 1505.

According to the example shown in FIG. 15, the charge holding region 1504 is disposed at a lower side of the photoelectric conversion section 1501, although the position of the charge holding region 1504 can be changed to another place. The image sensor of the fourth exemplary embodiment is different from the image sensor of the first exemplary embodiment in that the charge holding region 1504 and the floating diffusion layer section 1505 are independently provided in the same pixel.

Figure 16:
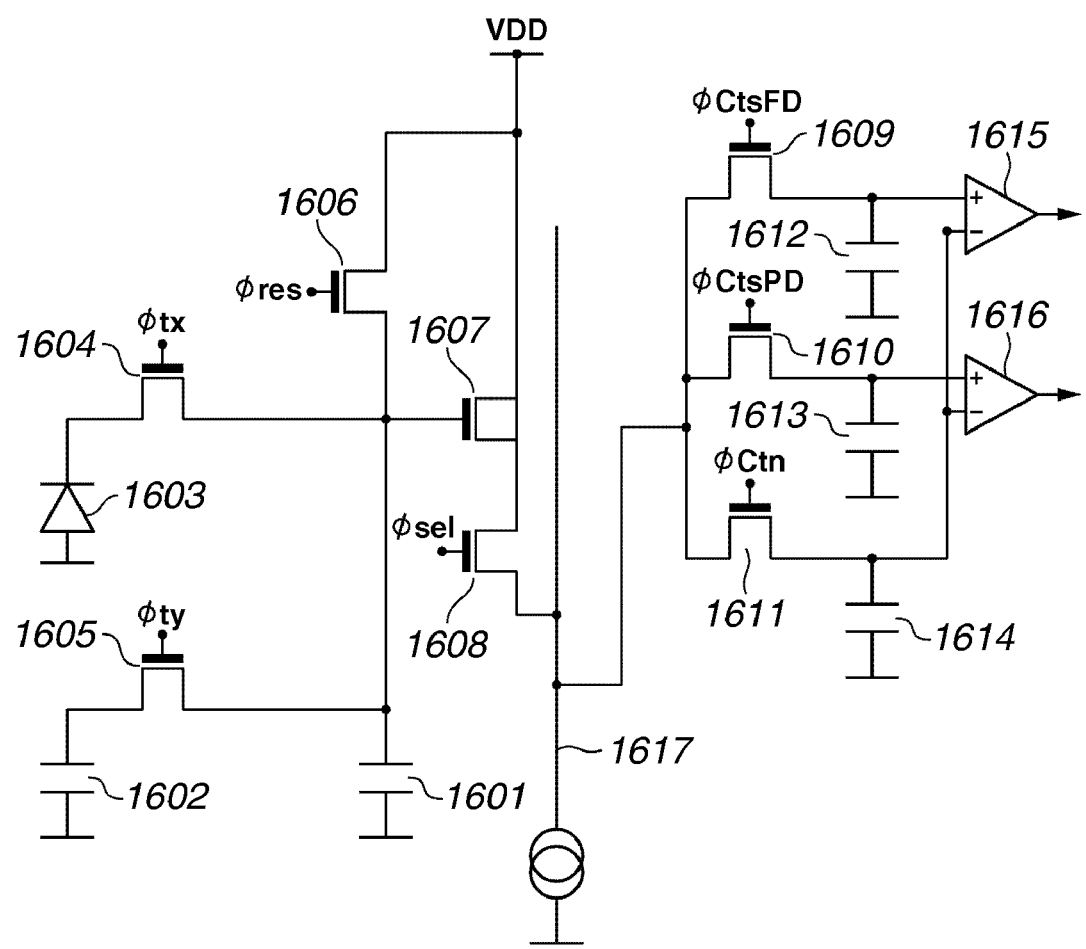
FIG. 16 is a circuit diagram illustrating an internal arrangement of the image sensor according to the fourth exemplary embodiment.
Figure 17:
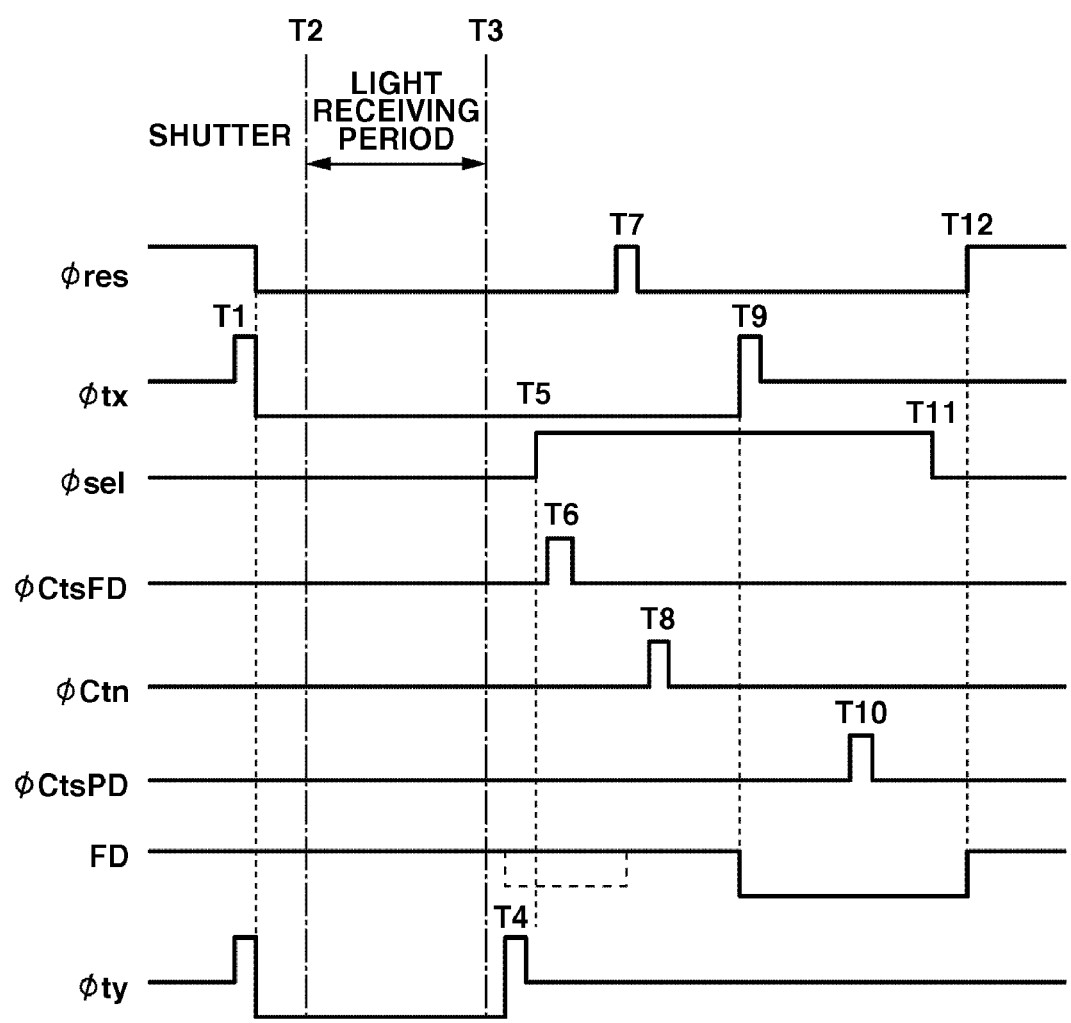
FIG. 17 is a timing chart illustrating an operation of the image sensor according to the fourth exemplary embodiment.

FIG. 16 is a circuit diagram illustrating an internal arrangement of the image sensor according to the fourth exemplary embodiment. FIG. 16 is an equivalent circuit corresponding to the pixel arrangement shown in FIG. 15. FIG. 17 is a timing chart illustrating an operation of the image sensor according to the fourth exemplary embodiment.

A photoelectric conversion section 1603 can convert incident light into electric charge. A charge holding region 1602 stores the electric charge generated by the photoelectric conversion section 1603. The charge holding region 1602 is a light-shielded region independent of the photoelectric conversion section 1603. When a charge amount exceeds a saturation charge amount of the photoelectric conversion section 1603, part of an excessive charge (i.e., the charge amount exceeding the saturation charge amount) is discharged to the charge holding region 1602.

The photoelectric conversion section 1603 is connected to the gate of an amplification MOSFET 1607 via a first transfer section (i.e., a transfer MOSFET 1604). The amplification MOSFET 1607 functions as a source follower amplifier. The charge holding region 1602 is connected to the gate of the amplification MOSFET 1607 via a second transfer section (i.e., a transfer MOSFET 1605). Furthermore, the gate of the amplification MOSFET 1607 is connected to a floating diffusion layer 1601.

The amplification MOSFET 1607 can amplify signal charges of the photoelectric conversion section 1603 and the charge holding region 1602. Furthermore, the gate of the amplification MOSFET 1607 is connected to a reset MOSFET 1606. When the reset MOSFET 1606 is turned on, the floating diffusion layer 1601 is reset to the electric potential of a power source voltage VDD.

When a pixel selection MOSFET 1608 is turned on, the amplification MOSFET 1607 becomes active and can amplify each signal. The amplified signals are respectively transferred, via transfer MOSFETs 1609 through 1611, to a capacitor 1612 storing a saturated light quantity signal, a capacitor 1613 storing a photoelectric conversion section signal, and a capacitor 1614 storing an offset noise, depending on the type of each signal.

An example of the reading processing is described with reference to the timing chart shown in FIG. 17. At the timing before T1, an electric potential φres is a positive electric potential and electric potentials φtx, φty, φsel, φCtsFD, φCtsPD, and φCtn are 0 V. Therefore, the reset MOSFET 1606 is in an ON state. The power source electric potential VDD is supplied to the floating diffusion layer 1601.

Next, electric potentials φtx and φty are applied as positive pulses at timing T1. As a result, both the transfer MOSFET 1604 and the transfer MOSFET 1605 turn on. The power source electric potential VDD is applied to each of the floating diffusion layer 1601, the charge holding region 1602, and the photoelectric conversion section 1603 for reset.

After completing the reset, the electric potential φres is reduced to 0 V to turn off the reset MOSFET 1606. Then, both the electric potentials φtx and φty become 1.3 V to bring each of the photoelectric conversion section 1603, the charge holding region 1602, and the floating diffusion layer 1601 into a floating state. At this moment, the mechanical shutter 102 is not yet opened. Therefore, storage of photoelectric charge at the photoelectric conversion section 1603 is not yet started.

Next, the mechanical shutter 102 is opened at timing T2 to start receiving light at the photoelectric conversion section 1603. Thus, the photoelectric conversion section 1603 starts generation and storage of photoelectric charge. If the photoelectric conversion section 1603 receives weak light, the photoelectric conversion section 1603 may not be saturated. No electric charge flows from the photoelectric conversion section 1603 to the charge holding region 1602.

On the other hand, if the photoelectric conversion section 1603 receives strong light, the photoelectric conversion section 1603 may be saturated, and part of charge overflows the photoelectric conversion section 1603 and flows into the charge holding region 1602.

Next, the mechanical shutter 102 is closed at timing T3 to terminate receiving at the photoelectric conversion section 1603. Thus, the photoelectric conversion section 1603 stops generation and storage of photoelectric charge.

Next, the electric potential φty is applied as a positive pulse at timing T4. As a result, the transfer MOSFET 1605 turns on. The electric charge stored in the charge holding region 1602 is read out to the floating diffusion layer 1601.

In FIG. 17, the electric potential FD of the floating diffusion layer 1601 is expressed by a solid line and a dotted line. The solid line indicates the change of the electric potential FD in a case where the photoelectric conversion section 1603 receives weak light and no electric charge overflows the photoelectric conversion section 1603 and flows into the charge holding region 1602. On the other hand, the dotted line indicates the change of the electric potential FD in a case where the photoelectric conversion section 1603 receives strong light and electric charge flows from the photoelectric conversion section 1603 to the charge holding region 1602. When the electric charge is read out of the charge holding region 1602 to the floating diffusion layer 1601, the floating diffusion layer 1601 has a decreased electric potential.

Next, at timing T5, the electric potential φsel jumps to a positive electric potential from 0 V. As a result, the selection MOSFET 1608 turns on and the signal output line 1617 becomes active. The amplification MOSFET 1607, functioning as a source flower amplifier, generates an output voltage to the signal output line 1617 according to the electric potential of the floating diffusion layer 1601.

Next, the electric potential φCtsFD is applied as a positive pulse at timing T6. As a result, the transfer MOSFET 1609 turns on and the capacitor 1612 stores an electric potential of the signal output line 1617 which corresponds to an electric potential of the floating diffusion layer 1601. If the photoelectric conversion section 1603 of a pixel is not saturated, no electric charge flows into the charge holding region 1602. The capacitor 1612 stores an output corresponding to the reset voltage VDD of the floating diffusion layer 1601. On the other hand, if the photoelectric conversion section 1603 receives strong light, the photoelectric conversion section 1603 may be saturated. In this case, the capacitor 1612 stores an output lower than the reset voltage VDD of the floating diffusion layer 1601.

Next, the electric potential φres is applied as a positive pulse at timing T7. As a result, the reset MOSFET 1606 turns on. The floating diffusion layer 1601 is again reset to the power source electric potential VDD.

Next, the electric potential φCtn is applied as a positive pulse at timing T8. As a result, the transfer MOSFET 1611 turns on and the capacitor 1614 stores an offset noise voltage of the signal output line 1617 in a condition that the floating diffusion layer 1601 is reset.

Next, the electric potential φtx is applied as a positive pulse at timing T9. As a result, the transfer MOSFET 1604 turns. The electric charge stored in the photoelectric conversion section 1603 is read out to the floating diffusion layer 1601.

Next, the electric potential φCtsPD is applied as a positive pulse at timing T10. As a result, the transfer MOSFET 1610 turns on. The capacitor 1613 stores a voltage of the signal output line 1617 which corresponds to an electric charge read out of the photoelectric conversion section 1603 to the floating diffusion layer 1601.

Next, the electric potential φsel decreases to 0 V at timing T11. As a result, the selection MOSFET 1608 turns off and the signal output line 1617 becomes inactive. Next, the electric potential φres is supplied as a positive electric potential at timing T12. As a result, the reset MOSFET 1606 turns on and an electric potential of the floating diffusion layer 1601 is fixed to the power source electric potential VDD.

Through the above-mentioned processing, the capacitor 1614 can store an electric charge corresponding to the offset noise. The capacitor 1612 can store an electric charge corresponding to an overflow amount from the photoelectric conversion section 1603 to the charge holding region 1602. The capacitor 1613 can store an electric charge corresponding to the charge stored in the photoelectric conversion section 1603.

A differential amplifier 1615 produces an output voltage representing a difference between the signal voltage of the capacitor 1612 and the noise voltage of the capacitor 1614. A differential amplifier 1616 produces an output voltage representing a difference between the signal voltage of the capacitor 1613 and the noise voltage of the capacitor 1614. Then, the output signal produced from the differential amplifier 1615 can be taken out as a saturated light quantity signal. The output signal produced from the differential amplifier 1616 can be taken out as a photoelectric conversion section signal. Both the saturated light quantity signal and the photoelectric conversion section signal can be stored in the image memory 109 (refer to FIG. 1).

The color mixture correction processing applied to a saturated light quantity signal read out of a charge holding region can be performed in a similar manner as in the first through third exemplary embodiments. However, if the processing is performed in a similar manner as in the first or second exemplary embodiment, a first portion pixel row, pixel column) to be corrected can be adequately selected considering the positional relationship between a charge holding region and a photoelectric conversion section.

For example, when the charge holding region 1504 is positioned at a lower side of the photoelectric conversion section 1501 as shown in FIG. 15, the calculation can be started from the lower edge of the pixel array (i.e., y=Y in FIG. 9). Furthermore, the approximation used in the correction processing can be performed in a similar manner as in the second or third exemplary embodiment. In this case, when the charge holding region 1504 is positioned at a lower side of the photoelectric conversion section 1501 as shown in FIG. 15, the approximation is only applied to the vertical direction (y direction).

The above-described exemplary embodiments of the present invention can be realized by a computer that executes various processing based program(s). Furthermore, to realize the exemplary embodiments of the present invention, any computer-readable recording medium (e.g., a compact disk—ROM (CD-ROM)) can be used to supply program(s) to a computer. Any transmission medium, such as the Internet, can be used to transmit program(s).

Moreover, the present invention encompasses any program(s), any recording medium, any transmission medium, and any program product which can be used to realize the above-described exemplary embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-091708 filed Mar. 29, 2006, which is hereby incorporated by reference herein in its entirety.

What is claimed:

1. An imaging apparatus comprising:
a plurality of pixel portions, each including a photoelectric conversion section and a holding section, wherein the holding section is configured to hold a mixed saturation signal containing a saturation signal overflowing a photoelectric conversion section of the same pixel portion and a saturation signal overflowing a photoelectric conversion section of another pixel portion which functions as a color mixture component;
a color mixture correcting section configured to correct a color mixture component contained in the mixed saturation signal read out of the holding section; and
a combining section configured to combine a photoelectric conversion signal read out of the photoelectric conversion section and a corrected saturation signal corrected by the color mixture correcting section.

2. The imaging apparatus according to claim 1, further comprising a storage section configured to store ratio data representing a ratio of a saturation signal flowing into a holding section of another pixel portion to a saturation signal flowing into a holding section of the same pixel portion,
wherein the color mixture correcting section calculates the corrected saturation signal based on a level of the mixed saturation signal and the ratio data.

3. The imaging apparatus according to claim 2, wherein the plurality of pixel portions are arrayed in a two-dimensional pattern extending in both horizontal and vertical directions, and
wherein the ratio data includes first ratio data, second ratio data, and third ratio data, wherein the first ratio data represents a ratio of a saturation signal flowing into a holding section of a pixel portion neighboring in the horizontal direction to a saturation signal flowing into a holding section of the same pixel portion, the second ratio data represents a ratio of a saturation signal flowing into a holding section of a pixel portion neighboring in the vertical direction to the saturation signal flowing into the holding section of the same pixel portion, and the third ratio data represents a ratio of a saturation signal flowing into a holding section of a pixel portion neighboring in a diagonal direction to the saturation signal flowing into the holding section of the same pixel portion.

4. The imaging apparatus according to claim 1, wherein the color mixture correcting section is configured to correct the color mixture component contained in the mixed saturation signal when a photoelectric conversion signal from a photoelectric conversion section of a pixel portion neighboring in a direction along which the holding section is disposed has a signal level greater than a predetermined level.

5. A method for an imaging apparatus including a plurality of pixel portions, each including a photoelectric conversion section and a holding section, wherein the holding section is configured to hold a mixed saturation signal containing a saturation signal overflowing a photoelectric conversion section of the same pixel portion and a saturation signal overflowing a photoelectric conversion section of another pixel portion which functions as a color mixture component, the method comprising:
correcting a color mixture component contained in the mixed saturation signal read out of the holding section; and
combining a photoelectric conversion signal read out of the photoelectric conversion section and a corrected saturation signal subjected to color mixture correction.

* * * * *